(12) United States Patent
Shiue

(10) Patent No.: US 8,856,962 B2
(45) Date of Patent: *Oct. 14, 2014

(54) SURFACE-TREATED WATER SPORTS GARMENT

(75) Inventor: Min-Chen Shiue, Yilan County (TW)

(73) Assignee: Shei Chung Hsin Ind. Co., Ltd., Wujei (TW)

( * ) Notice: Subject to any disclaimer, the term of this patent is extended or adjusted under 35 U.S.C. 154(b) by 286 days.

This patent is subject to a terminal disclaimer.

(21) Appl. No.: 13/332,376

(22) Filed: Dec. 21, 2011

(65) Prior Publication Data

US 2013/0160179 A1    Jun. 27, 2013

(51) Int. Cl.
B63C 11/04    (2006.01)

(52) U.S. Cl.
USPC ............................................. 2/2.15

(58) Field of Classification Search
USPC ...................... 2/2.15, 21.16, 69, 69.5, 81, 82
See application file for complete search history.

(56) References Cited

U.S. PATENT DOCUMENTS

| 4,416,027 | A  | * | 11/1983 | Perla ................................. 2/275 |
| 4,741,050 | A  | * | 5/1988  | O'Kane et al. ................. 112/413 |
| 4,915,046 | A  | * | 4/1990  | Meistrell ....................... 112/419 |
| 6,415,449 | B2 | * | 7/2002  | Duplock ........................... 2/275 |
| 6,514,590 | B1 | * | 2/2003  | Shih ................................. 428/60 |
| 7,921,467 | B2 | * | 4/2011  | Geidenmark ..................... 2/2.15 |
| 8,393,012 | B2 | * | 3/2013  | Shiue ................................ 2/2.15 |
| 8,539,612 | B2 | * | 9/2013  | Shiue ................................ 2/2.15 |

* cited by examiner

Primary Examiner — Tejash Patel

(57) ABSTRACT

A surface-treated water sports garment with the outer rubber glue layer and a surface treating method thereof is provided. The rubber glue layer can closely join a rubber sponge layer to provide water-repellence and wear-resistance to the surface-treated water sports garment.

14 Claims, 1 Drawing Sheet

SURFACE-TREATED WATER SPORTS GARMENT

BACKGROUND

1. Technical Field

The disclosure relates to a garment. More particularly, the disclosure relates to a water sports garment.

2. Description of Related Art

Water sports, such as diving, surfing and canoeing, usually need various degrees of water-repellence. The water-repellence of the water sports garment, such as clothes, hats, gloves and boots, is usually relied on a material of latex or rubber.

Latex is a stable dispersion or emulsion of natural latex rubber, especially non-vulcanized rubber, in an aqueous medium. Therefore in the case of latex, the water sports garment is usually made from sewed pieces of fabrics and a latex coating layer covering the outer surface of the garment, especially the sewed seams between fabrics. However, the latex coating layer is usually formed by dipping the garments in a latex bath for several times, and the speed for putting in and pulling out the garments has to be slow for avoiding the surface fluctuation of the latex bath to better control the dipping depth of the garments. After each time of dipping, the coated garment has to be dried and vulcanized in a relatively low temperature for a relatively long time to avoid generating pores in the latex coated layer by vapor bubbles to damage the latex coated layer. Therefore, the production line of the latex coated garment is usually 20-30 meters long. Accordingly, the dipping method for the latex coated garment is quite time, energy, and space consuming. Moreover, latex does not have good wear-resistance.

In the rubber case, the water-repellence of the garment is majorly relied on a layer of rubber sponge having a thickness of at least 2.5 mm. For wearer's comfort, the inner surface of the rubber sponge is usually laminated by a fabric layer. For protecting the fragile rubber sponge, the outer surface of the rubber sponge can be further covered by another fabric layer. Hence, the water sports garment is usually made from sewed pieces of a laminated sheet having a rubber sponge layer and a fabric layer, or a laminated sheet having a rubber sponge layer sandwiched by two fabric layers. The cutting surfaces of the laminated sheets are especially glued by water-repellent glue to prevent water leakage from the sewed seams. However, the water-repellent glue still cannot have good water-repellence; water still can penetrate the sewed seams to make the wearer uncomfortable.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present invention is directed to a treating method of a water sports garment's surface. The method comprises the following steps. A garment is put on a support smaller than an inner space of the garment. The garment is made from sewed pieces of laminated sheets, each of which comprises a rubber sponge layer and a first fabric layer covering the inner surface of the rubber sponge layer. At least a portion of the garment is then brushed with a rubber glue solution. The composition of the rubber glue solution comprises 100 parts by weight of a synthetic elastomer, 7-13 parts by weight of a vulcanizing agent, 1-3 parts by weight of an antioxidant agent, 10-20 parts by weight of a plasticizer, 50-120 parts by weight of a filler, and a solvent. The rubber glue solution is vulcanized to form a rubber glue layer on the outer surface of the garment.

According to an embodiment of this invention, the rubber glue solution may further comprise an accelerator to increase the vulcanizing rate.

According to another embodiment of this invention, the rubber glue solution may further comprise a color pigment.

According to yet another embodiment of this invention, the laminated sheets may further comprise a second fabric layer covering the outer surface of the rubber sponge layer.

In another aspect, a surface-treated water sports garment comprising sewed pieces of laminated sheets. The laminated sheet comprises a first fabric layer, a rubber sponge layer on the first fabric layer, and a rubber glue layer on the rubber sponge layer. The composition before vulcanizing the rubber glue layer comprises 100 parts by weight of a synthetic elastomer, 7-13 parts by weight of a vulcanizing agent, 1-3 parts by weight of an antioxidant agent, 10-20 parts by weight of a plasticizer, and 50-120 parts by weight of a filler.

According to an embodiment of this invention, the laminated sheets further comprise a second fabric layer between the rubber sponge layer and the rubber glue layer.

Many of the attendant features will be more readily appreciated as the same becomes better understood by reference to the following detailed description considered in connection with the accompanying drawings.

DETAILED DESCRIPTION

Figure 1A:
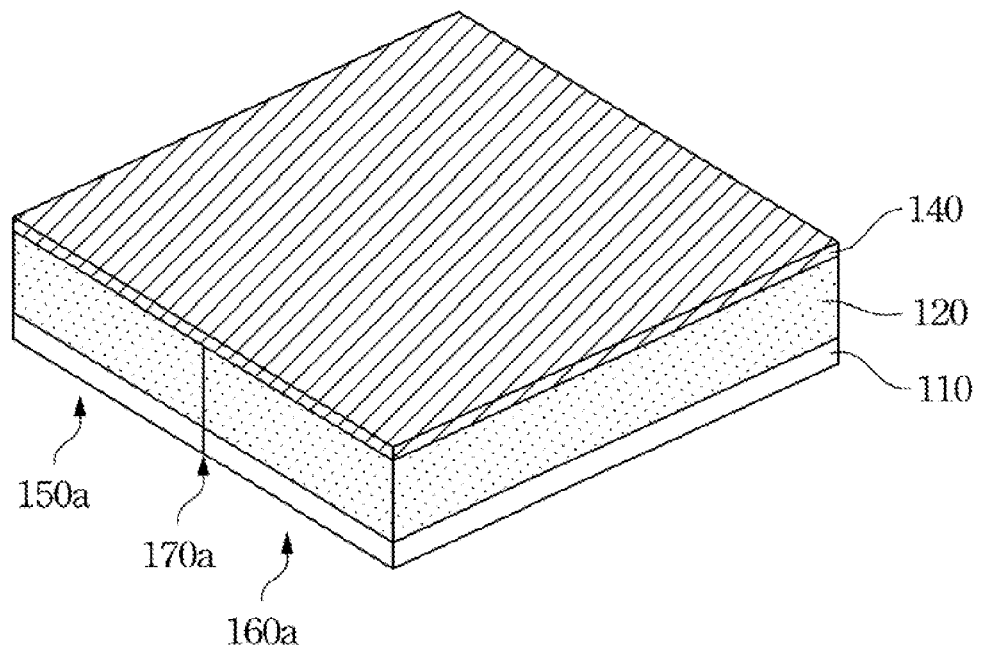
FIG. 1A is a perspective diagram of sewed pieces of laminated sheets of a water sports garment according to an embodiment of this invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Sewed Pieces of Laminated Sheets of Water Sports Garment

FIG. 1A is a perspective diagram of sewed pieces of laminated sheets of a water sports garment according to an embodiment of this invention. In FIG. 1A, the sewed pieces of laminated sheets 150*a* and 160*a* are made by sequentially laminating a first fabric layer 110, a rubber sponge layer 120, and a rubber glue layer 140. A seam 170*a* is formed by gluing and sewing the laminated sheets 150*a* and 160*a* arranged side by side.

Figure 1B:
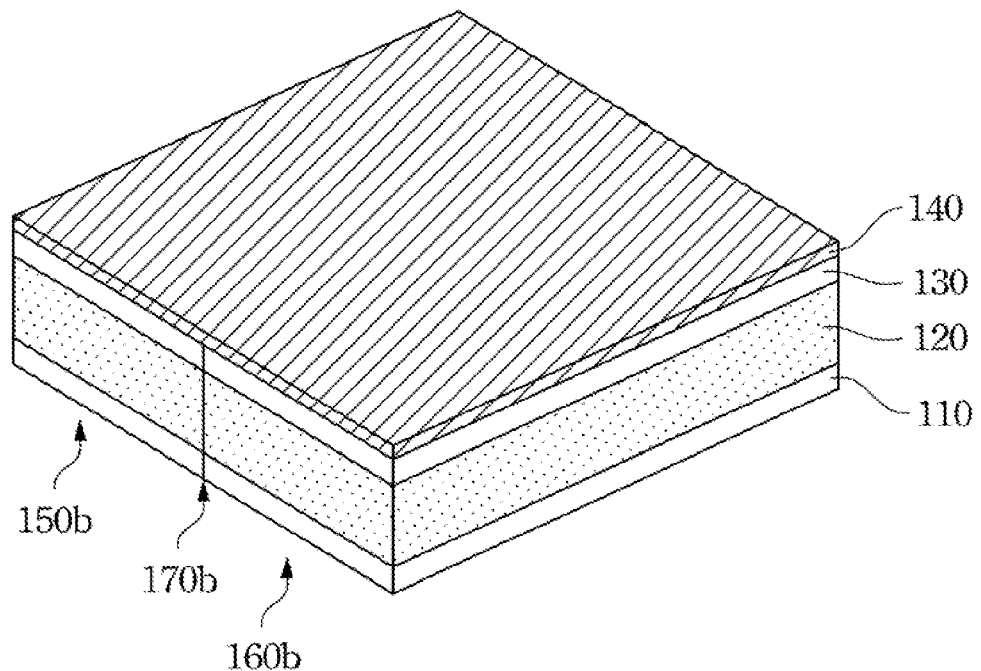
FIG. 1B is a perspective diagram of sewed pieces of laminated sheets of a water sports garment according to another embodiment of this invention.

FIG. 1B is a perspective diagram of sewed pieces of laminated sheets of a water sports garment according to another embodiment of this invention. In FIG. 1B, the sewed pieces of laminated sheets 150*b* and 160*b* are made by sequentially laminating a first fabric layer 110, a rubber sponge layer 120, a second fabric layer 130, and a rubber glue layer 140. A seam 170*b* is formed by gluing and sewing the laminated sheets 150*b* and 160*b* arranged side by side.

The material of the first fabric layer 110 and the second fabric layer 130 above can be nylon, polyethylene terephthalate, polypropylene, or combinations thereof. In addition to the materials above, the above materials of the first fabric layer 110 and the second fabric layer 130 can be blended with elastic fibers, such as spandex or elastane. The material of the rubber sponge layer 120 above can be nature rubber or butyl rubber, for example. The initial composition of the rubber glue layer 140, i.e. before vulcanizing the rubber glue layer 140, comprises 100 parts by weight of a synthetic elastomer, 7-13 parts by weight of a vulcanizing agent, 1-3 parts by weight of an antioxidant agent, 10-20 parts by weight of a plasticizer, and 50-120 parts by weight of a filler.

The synthetic elastomer above can be polychloroprene, for example. The vulcanizing agent for vulcanizing the synthetic elastomer can be MgO, ZnO or a combination thereof, for example. The antioxidant agent for preventing the oxidation of the synthetic elastomer can be nickel N,N-di-alkyl-aminodithiocarboxylate, 4,4'-bis(2,2-dimethylbenzyl) diphenylamine, or a combination thereof, for example. The plasticizer for improve the softness of the rubber glue layer 140 can be an aromatic oil, such as naphthenic oil, for example. The aromatic oil is a by-product of petroleum pyrolysis. The filler, for decreasing the viscosity of the rubber glue solution used to form the rubber glue layer 140 and increasing the surface smoothness of the rubber glue layer 140, can be $CaCO_3$, for example.

According to one embodiment of this invention, the above initial composition of the rubber glue layer 140 may further comprise an accelerator to increase the vulcanizing rate of the rubber glue layer 140. The accelerator can be a thiourea, a dithiocarbamate, or a combination thereof, for example. The thiourea may be diethyl thiourea, for example. The dithiocarbamate may be tellurium diethyl dithiocarbamate, for example.

According to another embodiment of this invention, the above initial composition of the rubber glue layer 140 may further comprise a color pigment, such as carbon black.

Surface Treating Method of Sewed Pieces of Laminated Sheets for Water Sports Garment The rubber glue layer 140 of the sewed laminated sheets of the water sports garments in FIGS. 1A and 1B is used to increase the water-repellence and wear resistance of the sewed laminated sheet. The sewed laminated sheets of the water sports garments in FIGS. 1A and 1B can be formed by the following step.

First, a garment is put on a support smaller than an inner space of the garment. The support used in this method needs not to be a one-to-one mold to fulfill the inner space of the garment, since the rubber glue layer 140 will be formed on the outer surface of the garment by brushing.

According to an embodiment of this invention, the garment above is made of an initial laminated sheet comprising at least a rubber sponge layer (corresponding to the rubber sponge layer 120 in FIG. 1A) and a first fabric layer (corresponding to the first fabric layer 110 in FIG. 1A) covering an inner surface of the rubber sponge layer for wearing comfortably.

According to another embodiment of this invention, the garment above is made of an initial laminated sheet comprising at least a rubber sponge layer (corresponding to the rubber sponge layer 120 in FIG. 1B) sandwiched by a first fabric layer (corresponding to the first fabric layer 110 in FIG. 1B) and a second fabric layer (corresponding to the second fabric layer 130 in FIG. 1B).

Second, the garment is then brushed with a rubber glue solution for at least one time. For example, for gaining a better water-repellence, the garment can be brushed for two times.

In the first time, a more diluted rubber glue solution can be used to help the rubber glue solution penetrate, cover and join to the outer surface of the initial laminated sheets described above, especially the seams (corresponding to the seams 170a and 170b respectively in FIGS. 1A and 1B) between two laminated sheets arranged side by side. The viscosity of the more diluted rubber glue solution can be 2500-8000 cps. After drying the first coating layer of the rubber glue solution, a more concentrated rubber glue solution can be used to build up a needed thickness for the coated rubber glue solution. The viscosity of the more concentrated rubber glue solution can be 2500-15000 cps.

The composition of the rubber glue solution comprises 100 parts by weight of a synthetic elastomer, 7~13 parts by weight of a vulcanizing agent (relative to 100 parts by weight of the synthetic elastomer), 1~3 parts by weight of an antioxidant (relative to 100 parts by weight of the synthetic elastomer), 10~20 parts by weight of a plasticizer (relative to 100 parts by weight of the synthetic elastomer), 50~120 parts by weight of a filler (relative to 100 parts by weight of the synthetic elastomer), and a solvent. The materials of the synthetic elastomer, the vulcanizing agent, the antioxidant agent, and the filler have been discussed above, and thus omitted here. The solvent as above-mentioned can be toluene, xylene, or a combination thereof, for example. The viscosity of the rubber glue solution is better to be 2,000~30,000 cps for the coating purpose. Optionally, the rubber glue solution may further comprise an accelerator, and a pigment as discussed above, and thus omitted here.

Next, the rubber glue solution is vulcanized to form a rubber glue layer (corresponding to the rubber glue layer 140 in FIGS. 1A and 1B) on the outer surface of the garment. A water sports garment with water-repellence is therefore obtained. According to the accelerator used, this vulcanizing step can be performed at high temperature (100-160° C.) or at room temperature without any heating. If both of the thiourea and the dithiocarbamate are used as the accelerator, the vulcanizing step can be performed at room temperature. If only the thiourea is used as the accelerator, the vulcanizing step has to be performed at high temperature.

Accordingly, the rubber glue layer can better penetrate and cover the seams between pieces of the laminated sheets and closely join to the outer surface of the rubber sponge layer. Therefore, the water sports garments provided by this disclosure can provide a better water-repellence than the conventional rubber garments for water sports. Especially, the brushing method for the surface treating above is quite time, space and cost saving, comparing with the dipping method used for latex coating. In addition to the good wear-resistance provided by the rubber glue, the water sports garment and the surface treating method disclosed in this disclosure can provide a better water-repellence and wear resistance than the prior arts.

All the features disclosed in this specification (including any accompanying claims, abstract, and drawings) may be replaced by alternative features serving the same, equivalent or similar purpose, unless expressly stated otherwise. Thus, each feature disclosed is one example only of a generic series of equivalent or similar features.

What is claimed is:

1. A treating method of a water sports garment's surface, comprising:
    putting a garment on a support smaller than an inner space of the garment, wherein the garment is made from sewed pieces of laminated sheets, each said laminated sheet comprising a rubber sponge layer and a first fabric layer covering an inner surface of the rubber sponge layer;

brushing the garment with a rubber glue solution for at least one time, wherein the composition of the rubber glue solution comprises:

100 parts by weight of a synthetic elastomer;

7~13 parts by weight of a vulcanizing agent, relative to said 100 parts by weight of said synthetic elastomer;

1~3 parts by weight of an antioxidant agent, relative to said 100 parts by weight of said synthetic elastomer;

10~20 parts by weight of a plasticizer, relative to said 100 parts by weight of said synthetic elastomer;

50~120 parts by weight of a filler, relative to said 100 parts by weight of said synthetic elastomer; and a solvent; and vulcanizing the rubber glue solution to form a rubber glue layer on an outer surface of the garment.

2. The treating method of claim 1, wherein the synthetic elastomer comprises polychloroprene.

3. The treating method of claim 1, wherein the vulcanizing agent is MgO, ZnO or a combination thereof.

4. The treating method of claim 1, wherein the antioxidant agent is nickel N,N-di-alkyl-aminodithiocarboxylate, 4,4'-bis (2,2-dimethylbenzyl)diphenyl amine, or a combination thereof.

5. The treating method of claim 1, wherein the plasticizer is an aromatic oil.

6. The treating method of claim 1, wherein the filler comprises $CaCO_3$.

7. The treating method of claim 1, wherein the solvent is toluene, xylene, or a combination thereof.

8. The treating method of claim 1, wherein the composition of the rubber glue solution further comprises an accelerator to increase the reaction rate of the vulcanizing step.

9. The treating method of claim 8, wherein the accelerator is a thiourea, a dithiocarbamate, or a combination thereof.

10. The treating method of claim 9, wherein the thiourea is diethyl thiourea.

11. The treating method of claim 9, wherein the dithiocarbamate is tellurium diethyl dithiocarbamate.

12. The treating method of claim 1, wherein the rubber glue solution further comprises a color pigment.

13. The treating method of claim 12, wherein the color pigment comprises carbon black.

14. The treating method of claim 1, wherein the laminated sheets further comprise a second fabric layer covering an outer surface of the rubber sponge layer.

* * * * *